United States Patent [19]

Angevine et al.

[11] 4,017,585
[45] Apr. 12, 1977

[54] FLUID BED CALCINATION PROCESS

[75] Inventors: Peter A. Angevine, Ridgefield; David W. Leyshon, Westport, both of Conn.

[73] Assignee: Dorr-Oliver Incorporated, Stamford, Conn.

[22] Filed: Oct. 29, 1974

[21] Appl. No.: 518,800

[52] U.S. Cl. .............................. 423/167; 23/262; 23/277 R; 23/284; 423/319; 423/320; 432/15; 432/58

[51] Int. Cl.² ......................................... C01B 25/16

[58] Field of Search .......... 423/167, 304, 319, 320; 71/44; 432/15

[56] References Cited

UNITED STATES PATENTS

| | | | |
|---|---|---|---|
| 1,032,763 | 7/1912 | Newberry et al. | 71/44 |
| 2,675,307 | 4/1954 | Klugh et al. | 71/44 |
| 3,617,242 | 11/1971 | Hollingsworth | 423/304 |
| 3,758,266 | 9/1973 | Retali et al. | 423/167 |
| 3,872,211 | 3/1975 | Wall | 423/167 |

*Primary Examiner*—G. O. Peters
*Assistant Examiner*—Wayne A. Langel
*Attorney, Agent, or Firm*—H. M. Snyder; Burtsell J. Kearns; Theodore M. Jablon

[57] ABSTRACT

Phosphate rock is calcined under conditions calculated to completely oxidize the carbon and sulfur in the rock. Calcination is also conducted at elevated temperature to eliminate cadmium metal, a poisonous substance in fertilizers, from the calcined rock product. A fluid bed system for eliminating cadmium metal in the calcination of phosphate rock involves a two-vessel system in which an independent cadmium removal vessel served by a separate fluidizing air stream carries out volatilization of cadmium, while preheating, precalcining and cooling is conducted in another multi-bed reactor which is served by a separate fluidizing air stream.

2 Claims, 1 Drawing Figure

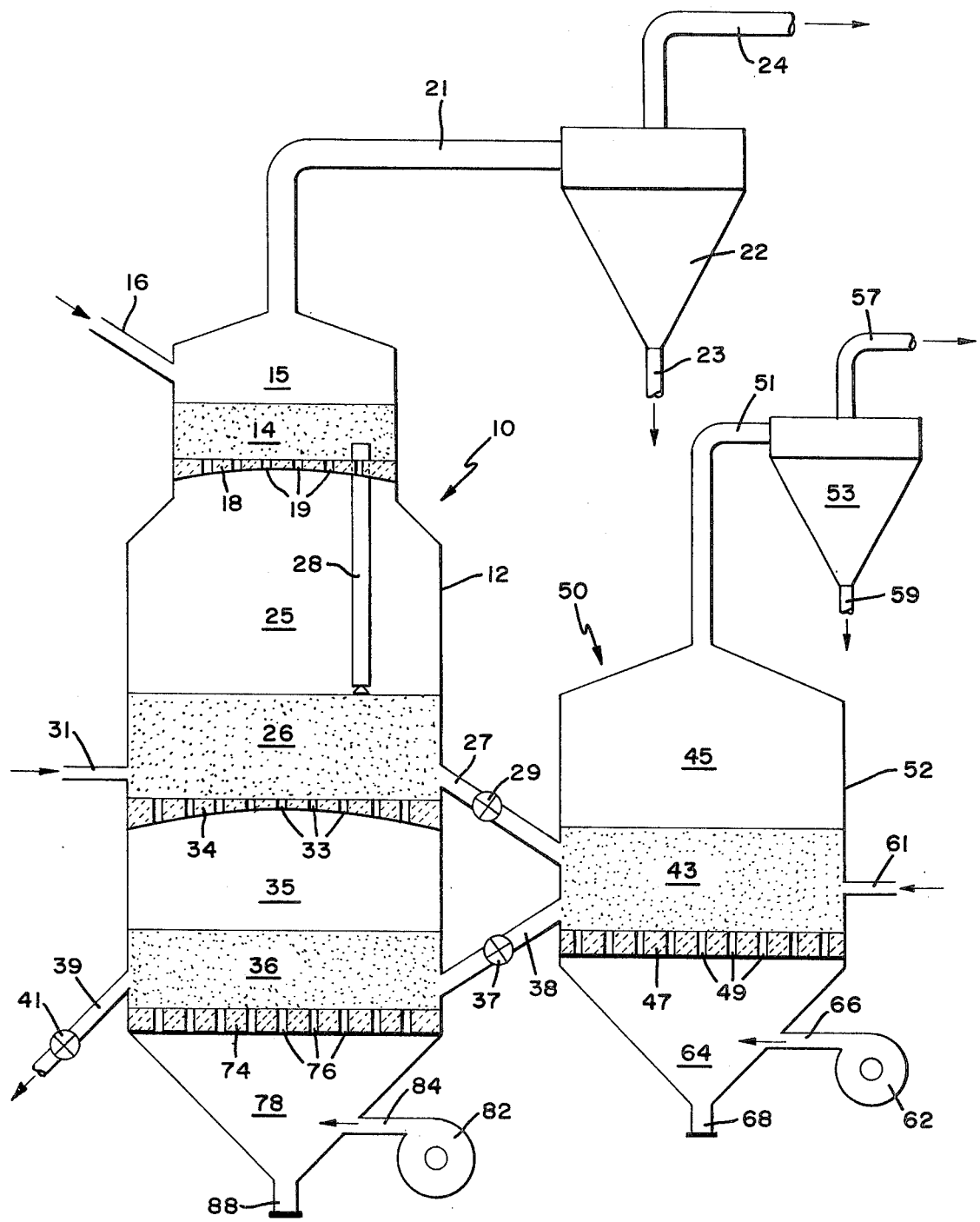

FLUID BED CALCINATION PROCESS

This invention is directed to improvements in the process for the fluid bed calcination of phosphate rock and, more particularly, to a process for yielding a calcined rock which upon acidulation will provide a relatively non-corrosive phosphoric acid solution and, further, a process capable of eliminating heavy metal contaminant from the calcined rock.

Phosphate rock is found in many places in the world in deposits of varying composition. In order to prepare the phosphate rock for making phosphoric acid, which is then utilized in subsequent reactions; i.e., the manufacture of triple superphosphate and for other valuable products, it is sometimes necessary to beneficiate the phosphate rock by removing certain of the impurities. Very often a substantial amount of limestone ($CaCO_3$) or dolomite ($CaMg(CO_3)_2$) and organic matter are associated with the phosphate rock and a calcining operation is indicated to burn the organic matter and to drive off $CO_2$ from the limestone or dolomite, leaving lime (CaO) and MgO, which may then be removed by slaking and separating. In this way, a substantial beneficiation of the phosphate rock is effected. Calcination is further beneficial because organics in the rock raise the surface tension of the phosphoric acid, and uncalcined limestone gives off $CO_2$, both causing foam in the acidulation circuit, lowering capacity and adding cost for defoamers.

In the preparation of phosphate rock for calcination, it is necessary to first remove the moisture content of the rock. Generally speaking, this moisture can be removed by heating the rock ("preheating") to evaporate the moisture. If impurities are present in the form of "slimes" (largely clay-like substances), a treatment such as washing and classification may be employed to separate and remove such substances prior to preheating especially if the amount of slimes would tend to overload the evaporative capacity of the preheating stage.

In the fluid bed calcination of phosphate rock, three fluid beds are commonly used. The upper or top fluid bed serves to dry and/or preheat the phosphate rock feed material. The middle bed serves to calcine the phosphate rock and also acts as a fuel combustion compartment. The calcining bed operates at temperatures in the range from about 730° C to about 785° C (~1350° F to ~1450° F). The bottom or lower bed serves to partially cool the hot calcined phosphate rock to a temperature of about 540° C (~1000° F) and to preheat the incoming fluidizing air. It is sometimes desirable to provide a hot cyclone between the calcining compartment and the feed preheating compartment to remove solids and dust from the calciner off-gases. A separate fluid bed, incorporating water sprays, may be used for final cooling of the calcines to a temperature of about 120° C (248° F) or less.

Certain impurities present in phosphate rock, primarily sulfides, which tend to remain in the calcined product, may, in the acidulation step (addition of $H_2SO_4$) for producing phosphoric acid, persist as highly reactive components of the acid solution which, as a consequence, is extremely corrosive in nature. This highly corrosive phosphoric acid solution can cause extensive damage to processing equipment and result in expensive downtime for repairs.

Some phosphate rocks contain, as an impurity, heavy metals, such as cadmium, in quantities which are quite high (20–200 ppm). The cadmium is solubilized in the acidulation circuit and the use of fertilizers containing soluble cadmium will result in contamination of the ground water. Cadmium is, of course, highly poisonous, as are other heavy metals.

It is an object of the invention to provide a calcined phosphate rock product which will produce, upon acidulation, a relatively non-corrosive phosphoric acid.

It is a further object of the invention to remove heavy metal contaminant from the phosphate rock in the calcining process.

It is still another object of the invention to provide a system for removing heavy metal contaminant from phosphate rock during calcining without undue recirculation of the heavy metal in the system.

Other objects and advantages will become apparent from the following description taken in conjunction with the accompanying drawing in which:

The FIGURE is a diagrammatic representation of a fluidized bed calcination system in which the present invention may be practiced.

Generally, speaking, the invention is directed to a process in which phosphate rock is calcined under oxidizing conditions thereby eliminating certain impurities of the phosphate rock which tend to product a highly corrosive phosphoric acid solution when the calcined rock product is acidulated. Further, the invention is directed to a calcination process in which the calcining temperature is in a range calculated to volatilize a heavy metal contaminant and so eliminate a poisonous constituent from fertilizers produced from the calcined rock product.

More particularly, oxidizing conditions are assured in the calcining compartment of the fluidized bed reactor by controlling the exhaust gases from the fluid reactor to contain at least 0.5%, say 1 to 5%, by volume, of excess oxygen and by operating at a fluid bed temperature of from about 800° C to about 845° C (~1470° F to ~1550° F) to assure that the oxidation reaction goes to completion. It should be understood that in establishing oxidizing conditions in the fluid bed, the average particle size of the phosphate rock will have to be taken into consideration. This particle size will lie in the range from about 6 mesh to about 325 mesh. If the average particle size is small, oxidation is facilitated. The detention time of the phosphate rock in the calcining fluid bed is also a consideration. In general, this detention time is from about 30 minutes to about 200 minutes. The phosphate rock is exposed to oxidizing conditions for a period sufficient to permit the reaction to go to completion.

It is important to oxidize the carbon present in the individual rock particles, because, if this is not done, localized regions of reduction can exist within the rock particles leading to the presence of sulfur in the sulfide state rather than in the desired sulfate state.

The heavy metal contaminant, cadmium, is eliminated from the calcined rock product by conducting the calcining reaction at a temperature in the range from about 1000° C to about 1150° C (1832° F to ~2100° F). In order to avoid a circulating load of heavy metal, a separate reactor vessel may be provided for carrying out the calcining operation. In this case, the preheating, precalcining and cooling beds are placed in one reactor vessel by a first gas stream and the calcining fluidized bed is arranged in a separate vessel served by an independent second gas stream which flows in parallel with said first gas stream. In this way, the heavy metals volatilized in the calcining vessel leave with the stack gases of that vessel and can be separately removed from the stack gases and disposed of.

The removal of cadmium from the phosphate rock during calcination is best conducted under neutral or slightly reducing conditions. Accordingly then, if a relatively non-corrosive acid is to be produced, operating conditions for cadmium removal must be carefully controlled. The oxidizing conditions established in the bed will require precise control of fuel and air rates to effect the cadmium removal without producing a highly corrosive product.

Referring to the drawing, it will be seen that a multiple compartment fluid bed reactor vessel 10, providing a fluidized bed treatment group, is illustrated and comprises a shell 12 which encloses the three fluid bed compartments; that is, the dryer/preheater compartment 15, the calciner compartment 25 and the cooling compartment 35. A feed conduit 16 opens into compartment 15 which has fluid bed 14 therein supported by constriction dome 18 which is penetrated by a plurality of tuyeres 19. An off-gas conduit 21 opens into chamber 15 and is connected to the cyclone 22, the latter having stack gas conduit 24 and apex conduit 23 connected thereto. A downcomer 28 extends from drying compartment 15 to the calcining compartment 25. The fluid bed 26 in compartment 25 is supported by the refractory constriction dome 34 which has tuyeres 33 located therein. Fuel gun 32 (only one is shown, but there may be several) extends through vessel shell 12 into fluid bed 26. Considering vessel 10 as an independently operable system, for the moment, conduits 27 and 38, which relate to a modified system, can be ignored. Cooling compartment 35 is located below the refractory dome 34 and has a fluid bed 36 located therein supported by constriction plate 74 which is penetrated by tuyeres 76. A downcomer (not illustrated) similar to downcomer 28 of chamber 25 is provided to connect fluid bed 26 with cooling chamber 35. Windbox 78 is located below constriction plate 74 with blower 82 connected to windbox by conduit 84. A cleanout outlet 88 is provided at the lowest point in windbox 78. A product discharge conduit 39 having valve 41 therein communicates with compartment 35 in the region of the fluid bed 36.

In operation, feed is introduced into drying/preheat chamber 15 through the feed inlet 16. The moist particulate rock fed into the chamber 15 makes up the fluidized bed 14 which is maintained in the fluidized state by hot air from the calcining chamber 25 which passes through the tuyeres 19 in the refractory constriction dome 18. The off-gases from the drying compartment 15 exit through the off-gas conduit 21 to enter the cyclone 22 where a gas-solid separation is effected with the solids exiting through the apex conduit 23 and the gases going to the stack through conduit 24. Gas samples are taken from conduit 24 for analysis with an Orsat Gas Analyzer. Dried phosphate rock flows into the downcomer 28 under the influence of gravity and in this way enters fluid bed 26 in the calcining compartment 25. Fuel is introduced directly into the fluid bed through the fuel gun 31 for combustion in the bed. The fluid bed 26 is supported in the fluidized state by preheated air passing through tuyeres 33 in the refractory constriction dome 34. The temperature in the fluidized bed 26 of calcination chamber 25 will lie in the range of from about 800° C to about 845° C. The temperature of the gases in the freeboard above the fluid bed 26 may be slightly lower than this and it is this gas which passes through the tuyeres 19 to fluidize and dry the incoming phosphate rock in chamber 15. The hot calcined rock in compartment 25 passes through the downcomer (not illustrated) which leads from the fluid bed 26 through the constriction dome 34 into chamber 35. The calcined phosphate rock is fluidized in chamber 35 by air at ambient temperature supplied by blower 82 through the conduit 84 into the windbox 78. This air passes through the tuyeres 76 located in the constriction plate 74. In fluidizing fluid bed 36 this air is heated to a temperature of from about 450° C to about 500° C and then passes through the freeboard region above the fluid bed 36 to pass through the restriction dome 34 into chamber 25. The cooled calcined phosphate rock, now at a temperature of from about 450° C to about 500° C, is discharged through the discharge conduit 39.

In a modified system, intended for the treatment of phosphate rock having an undesirable heavy metal (cadmium) content an additional fluid bed vessel 50 is employed to carry out the calcining function. In this arrangement, compartment 25 of the vessel 10 becomes a precalcining fluidized bed in which the temperature of the phosphate rock is raised to a level within the range of from about 700° C to about 800° C. The precalcined product is then introduced into the chamber 45 of the cadmium removal vessel 50 defined by the shell 52 through the conduit 27 in which valve 29 is located. The chamber 45 of vessel 50 has an off-gas conduit 51 leading to the cyclone 53 which has a solids outlet 59 and a gas conduit 57. The fluid bed 43 is located in the chamber 45 and is supported by the constriction plate 47 having a plurality of tuyeres 49 therein. The windbox 64 is located below the constriction plate 47 and is supplied with air at ambient temperature by the blower 62 through the conduit 66. A cleanout port 68 is provided at the lowest point of the windbox 64. A number of fuel guns 61 (only one is shown by way of example) penetrate the shell 52 at the level of the fluid bed 43 to inject fuel into the bed for combustion therein. A product discharge conduit 38 is provided between vessel 50 and vessel 10 to permit the calcined phosphate rock to flow by gravity into compartment 35 of the reactor vessel 10. In this modified system then, the precalcined product flows through conduit 27 into the cadmium removal compartment 45 of vessel 50 and is calcined there in the fluidized state and then is discharged back into vessel 10 where it passes through the fluidized bed 36 of the cooling compartment 35. The temperature of the fluid bed 43 reaches the level of from about 1000° C to about 1150° C. This temperature is sufficient to volatilize the heavy metal cadmium which is present and this constituent then leaves with the exhaust gases through the conduit 51 and is conducted to a point where it may be condensed from the hot gases and separately and safely disposed of. It should be understood that if it were attempted to employ vessel 10 alone on such cadmium-containing rock and to raise the temperature in the compartment 25 to the level necessary to volatilize the heavy metal, that this constituent would tend to condense in the chamber 15 and would therefore constitute a circulating load of the heavy metal which would ultimately frustrate efforts to remove the heavy metal from the calcined phosphate rock product.

The aspect of the invention directed to the production of a calcined phosphate rock product which will not give rise to a highly corrosive phosphoric acid solution is also applicable to the two-vessel system, just described. In this case, the oxidizing conditions would be maintained in the cadmium removal vessel 50. Again, the oxidizing conditions in the calcining vessel would be assured by maintaining the exhaust gases in conduit 51 with at least a 0.5% excess oxygen content. The operating temperature in the fluidized bed would be maintained in the range from about 1000° C to about 1150° C. This temperature is more than enough to assure that the oxidation reaction goes to completion. Under these conditions, acceptable cadmium removal will also be obtained.

Many calcining operations set out with the objective of only charring the organics at relatively low temperatures (less than 800° C), leaving elemental carbon in the rock. In these cases each particle will generate a reducing atmosphere within itself, producing sulfides which will result in increased corrosion in the acidulation circuit. An increase in the calcination temperature in the presence of sufficient oxygen will increase oxidation and accordingly produce a higher quality product of a less corrosive nature.

For the purpose of illustrating the advantages of the invention to those skilled in the art, the following examples are offered:

EXAMPLE I

Phosphate rock feed containing about 70 ppm of cadmium is calcined. Bed temperature is 1102° C with 1.8%, by volume, of $O_2$ in the exit gas. Bed detention time is 35.8 minutes. Particle size of the feed is +150 (about 94% retained on a screen of 150 Tyler mesh). The product phosphate rock contains 23 ppm of cadmium. Gypsum produced in the subsequent manufacture of phosphoric acid filtered well as indicated by filtration rates of 3.75–4.6 tons gypsum sq.ft./day.

EXAMPLE II

Phosphate rock feed containing about 70 ppm of cadmium is calcined under conditions simulating the detention time of a single compartment fluid bed unit at 1092° C bed temperature with 0.5%, by volume, of $O_2$ in the exit gas. Bed detention time is 173 minutes. Particle size of the feed is +150 (about 94% retained on a screen of 150 Tyler mesh). The product phosphate rock contains 5.5 ppm of cadmium.

EXAMPLE III

The process outlined in Example II is followed using a phosphate rock feed containing about 200 ppm of cadmium. Bed temperature is 1092° C with 0.4%, by volume, of $O_2$ in the exit gas. Detention time in the bed is 192 minutes. Particle size of the feed is +150 (90% retained on a screen of 150 Tyler mesh). The underflow product contains only 13 ppm of cadmium, a satisfactorily low level.

EXAMPLE IV

Phosphate rock feed containing about 200 ppm of cadmium is calcined at a detention time simulating the cadmium elimination compartment of a four-compartment system. The detention time is 63 minutes. Bed temperature is 1093° C with 0.5%, by volume, of $O_2$ in the exit gas. Particle size of the feed is +150 Tyler mesh (about 9% retained on a screen of 150 Tyler mesh). The product phosphate rock contains 18 ppm of cadmium.

In Examples I through IV, the phosphate rock product is calcined under oxidizing conditions at a temperature high enough so that substantially all of the sulfur and carbon in the rock is oxidized. The rock so treated was not unduly corrosive.

Phosphate rock feed from Nauru Island containing about 70 ppm of cadmium is calcined in a slightly reducing atmosphere (87% of stoichiometric air) at a detention time simulating a single compartment fluid bed calciner at 1000° C. Detention time is 34 minutes. Particle size of the feed is +150 Tyler mesh (94% retained on a screen of 150 Tyler mesh). The underflow product contains 18 ppm of cadmium, a satisfactory level, but the rock is blacker than well-oxidized rock indicating the precipitation of elemental carbon and, when acidulated, the rock produces gypsum which filters only half as well as rock calcined at about 1100° C (see Example I). Further, the rock calcined at 1000° C produces an acid which is twice as corrosive as that produced either from uncalcined rock or rock calcined at 1100° C under oxidizing conditions, as is indicated by analysis of the phosphoric acid for iron and chromium leached from the stainless steel reaction vessels. The acid produced from rock calcined under oxidizing conditions showed iron and chromium levels of 3900 and 460 ppm respectively. The acid produced from rock calcined under reducing conditions showed iron and chromium levels of 6300 and 825 ppm. Both analyses were made after 28 hours of acidulation. When the calcines produced under reducing conditions are slurried in water, the odor of hydrogen sulfide is observed, whereas the raw and oxidized rocks produce no such odors. The presence of sulfides in rocks calcined under reducing conditions is thus well established.

It is thus seen that the present invention provides a process for yielding a high quality calcined phosphate rock which will not produce a phosphoric acid which is unduly corrosive and further, a process which will eliminate contaminants such as cadmium from the product.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview of the scope of the invention and appended claims.

We claim:

1. A process for calcining phosphate rock containing contaminating quantities of the heavy metal cadmium comprising, preheating the phosphate rock in a primary chamber wherein the rock is fluidized by a first gas stream at a temperature of from about 700° C to about 800° C, the exhaust gas from said primary chamber being conducted to the stack, transferring the rock to a secondary chamber countercurrent to said first gas stream wherein fuel is injected into said chamber for combustion and the rock is fluidized by said first gas stream at a temperature of from about 450° C to about 500° C, transferring the rock for calcining to a tertiary chamber wherein fuel is injected for combustion to attain a temperature in the range from about 1000° C to about 1150° C to volatilize the cadmium and the rock is fluidized by a second gas stream flowing in parallel with said first gas stream, the exhaust gas and volatilized cadmium from said tertiary chamber being handled separately from the exhaust gas from said primary chamber so that the cadmium may be condensed therefrom for separate disposal, transferring the calcined rock to a cooling chamber for fluidization in said first gas stream, said calcined rock being cooled to a temperature of from about 450° C to about 500° C and the fluidizing gas being heated by said rock to this temperature range, discharging the cooled calcined rock from said cooling chamber and conducting the heated fluidizing gas to the secondary chamber as the fluidizing gas therefor.

2. A process for calcining cadmium-contaminated phosphate rock which is to be employed in the manufacture of phosphoric acid, the phosphate rock also containing significant quantities of the impurities carbon and sulfur, the calcination process to be connected in such a way as to avoid increasing the corrosive nature of the product phosphoric acid and removing the undesirable cadmium from the phosphate rock product, comprising, calcining the phosphate rock in a fluidized bed reactor at a temperature of from about 1000° C to about 1150° C while employing a detention time in the calcining fluidized bed of from 30 to 200 minutes to volatize the cadmium and so remove it from the phosphate rock as a vapor for disposal, maintaining oxidizing conditions in said reactor by controlling the exhaust gas from said reactor to contain at least about 0.5%, by volume, of oxygen so that the carbon and sulfur impurities are essentially completely oxidized and the formation of corrosive sulfide constituents is thereby prevented.

* * * * *